United States Patent
Zhou et al.

(10) Patent No.: US 9,296,932 B2
(45) Date of Patent: *Mar. 29, 2016

(54) ACCELERATED CURE COMPOSITION CONTAINING AN ISOCYANATE FUNCTIONAL PREPOLYMER

(75) Inventors: Lirong Zhou, Rochester Hills, MI (US); Gary L. Jialanella, Oxford, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/007,034

(22) PCT Filed: Apr. 25, 2012

(86) PCT No.: PCT/US2012/034868

§ 371 (c)(1),
(2), (4) Date: Sep. 24, 2013

(87) PCT Pub. No.: WO2012/151085

PCT Pub. Date: Nov. 8, 2012

(65) Prior Publication Data

US 2014/0014268 A1    Jan. 16, 2014

Related U.S. Application Data

(60) Provisional application No. 61/481,885, filed on May 3, 2011, provisional application No. 61/587,316, filed on Jan. 17, 2012.

(51) Int. Cl.

| C08G 18/10 | (2006.01) |
|---|---|
| C08G 18/12 | (2006.01) |
| C08G 18/20 | (2006.01) |
| C08G 18/86 | (2006.01) |
| C09J 175/04 | (2006.01) |
| C09J 175/08 | (2006.01) |
| C08G 18/40 | (2006.01) |

(52) U.S. Cl.
CPC .............. *C09J 175/08* (2013.01); *C08G 18/10* (2013.01); *C08G 18/12* (2013.01); *C08G 18/2018* (2013.01); *C08G 18/4072* (2013.01); *C08G 18/86* (2013.01); *C09J 175/04* (2013.01)

(58) Field of Classification Search
CPC ...... C09J 175/08; C09J 175/04; C08G 18/10; C08G 18/12; C08G 18/2018; C08G 18/4072; C08G 18/86
USPC .................. 524/507, 589, 590; 525/123, 455
See application file for complete search history.

(56) References Cited

U.S. PATENT DOCUMENTS

| 2,939,851 | A | * | 6/1960 | Orchin | C08G 18/2063 521/108 |
|---|---|---|---|---|---|
| 3,206,437 | A | * | 9/1965 | Cooper | C08G 18/161 528/44 |
| 3,707,521 | A | | 12/1972 | De Santis | |
| 3,779,794 | A | | 12/1973 | De Santis | |
| 4,345,053 | A | | 8/1982 | Rizk et al. | |
| 4,374,237 | A | | 2/1983 | Berger et al. | |
| 4,525,511 | A | | 6/1985 | Kirby et al. | |
| 4,538,920 | A | | 9/1985 | Drake | |
| 4,625,012 | A | | 11/1986 | Rizk et al. | |
| 4,687,533 | A | | 8/1987 | Rizk et al. | |
| 4,780,520 | A | | 10/1988 | Rizk et al. | |
| 5,063,269 | A | | 11/1991 | Hung | |
| 5,082,147 | A | | 1/1992 | Jacobs | |
| 5,115,086 | A | | 5/1992 | Hsieh | |
| 5,238,993 | A | | 8/1993 | Hsieh | |
| 5,410,051 | A | | 4/1995 | Forgione | |
| 5,466,727 | A | | 11/1995 | Hsieh | |
| 5,468,317 | A | | 11/1995 | Hsieh | |
| 5,603,798 | A | | 2/1997 | Bhat | |
| 5,623,044 | A | | 4/1997 | Chiao | |
| 5,792,811 | A | | 8/1998 | Bhat | |
| 5,852,103 | A | | 12/1998 | Bhat | |
| 5,852,137 | A | | 12/1998 | Hsieh et al. | |
| 5,922,809 | A | | 7/1999 | Bhat et al. | |
| 5,976,305 | A | | 11/1999 | Bhat et al. | |
| 6,015,475 | A | | 1/2000 | Hsieh et al. | |
| 6,053,971 | A | | 4/2000 | Lin | |
| 6,423,810 | B1 | | 7/2002 | Huang et al. | |
| 6,512,033 | B1 | | 1/2003 | Wu | |
| 6,512,039 | B1 | | 1/2003 | Mowrey | |
| 6,559,257 | B2 | | 5/2003 | Quarmby | |

(Continued)

FOREIGN PATENT DOCUMENTS

| CA | 772229 A | 11/1967 |
|---|---|---|
| DE | 19924139 A1 | 11/2000 |

(Continued)

OTHER PUBLICATIONS

International Search Report and Written Opinion dated Jul. 5, 2012; for PCT Application No. US 2012/034870 filed Apr. 25, 2012.

(Continued)

*Primary Examiner* — Patrick Niland
(74) *Attorney, Agent, or Firm* — The Dobrusin Law Firm, P.C.

(57) ABSTRACT

A composition comprising: a) one or more isocyanate functional prepolymers; and b) one or more compounds containing one or more hydroperoxide groups; wherein components a) and b) are kept separate until cure is desired. The composition can be used in the form of a two part adhesive.

16 Claims, 1 Drawing Sheet

(56) References Cited

U.S. PATENT DOCUMENTS

| | | |
|---|---|---|
| 6,562,881 B2 | 5/2003 | Jacobine et al. |
| 6,596,787 B1 | 7/2003 | Levandoski et al. |
| 6,673,875 B2 | 1/2004 | Attarwala et al. |
| 6,706,831 B2 | 3/2004 | Sonnenschein et al. |
| 6,709,539 B2 | 3/2004 | Zhou |
| 6,852,801 B1 | 2/2005 | Briggs et al. |
| 7,025,851 B2 | 4/2006 | Caster et al. |
| 7,098,279 B2 | 8/2006 | Maandi et al. |
| 7,101,950 B2 | 9/2006 | Zhou et al. |
| 7,361,292 B2 | 4/2008 | Zhou |
| 7,408,012 B1 | 8/2008 | Kneafsey et al. |
| 7,416,599 B2 | 8/2008 | Hsieh et al. |
| 7,534,843 B2 | 5/2009 | Jialanella et al. |
| 7,737,241 B2 | 6/2010 | Feng et al. |
| 2002/0016226 A1 | 2/2002 | Jin et al. |
| 2002/0100550 A1* | 8/2002 | Mahdi et al. ............ 156/329 |
| 2004/0214912 A1 | 10/2004 | Rink |
| 2005/0126683 A1 | 6/2005 | Hsieh et al. |
| 2006/0124225 A1 | 6/2006 | Wu et al. |
| 2007/0142556 A1 | 6/2007 | Osae et al. |
| 2007/0155899 A1 | 7/2007 | Briggs et al. |
| 2008/0177004 A1 | 7/2008 | Osae et al. |
| 2009/0098388 A1 | 4/2009 | Harvey et al. |
| 2012/0034870 A9 | 2/2012 | Desai et al. |
| 2012/0279654 A1 | 11/2012 | Jialanella et al. |

FOREIGN PATENT DOCUMENTS

| | | |
|---|---|---|
| EP | 0603046 A1 | 6/1994 |
| EP | 0964012 A1 | 12/1999 |
| EP | 1260548 A1 | 11/2002 |
| EP | 1524282 A1 | 4/2005 |
| EP | 1557455 A1 | 7/2005 |
| GB | 1122128 A | 7/1968 |
| JP | 2010-529218 A | 8/2010 |
| WO | 02/44295 A2 | 6/2002 |
| WO | 03/040248 A2 | 5/2003 |
| WO | 2006/038999 A1 | 4/2006 |
| WO | 2008/153673 A1 | 12/2008 |
| WO | 2010/030519 A1 | 3/2010 |
| WO | 2012/151086 A1 | 11/2012 |

OTHER PUBLICATIONS

Kohler et al., *An Apparatus for Determining Both the Quantity of Gas Evolved and the Amount of Reagent Consumed in Reactions with Methyl Magnesium, Iodide*, 49 Journal of the American Chemical Society 3181, 3181-88 Dec. 10, 1927.

Second Written Opinion for PCT/US2012/034870 mailed May 17, 2013.

International Search report and Written Opinion dated Jul. 5, 2012 (PCT/US2012/034868).

International Preliminary report on Patentability dated May 21, 2013 (PCT/US2012/034868).

Japanese Office Action for Japanese Application No. 2014-505414; dated Jul. 22, 2014.

Chinese Office Action for Chinese application No. 201280021520X dated Jul. 23, 2014.

\* cited by examiner

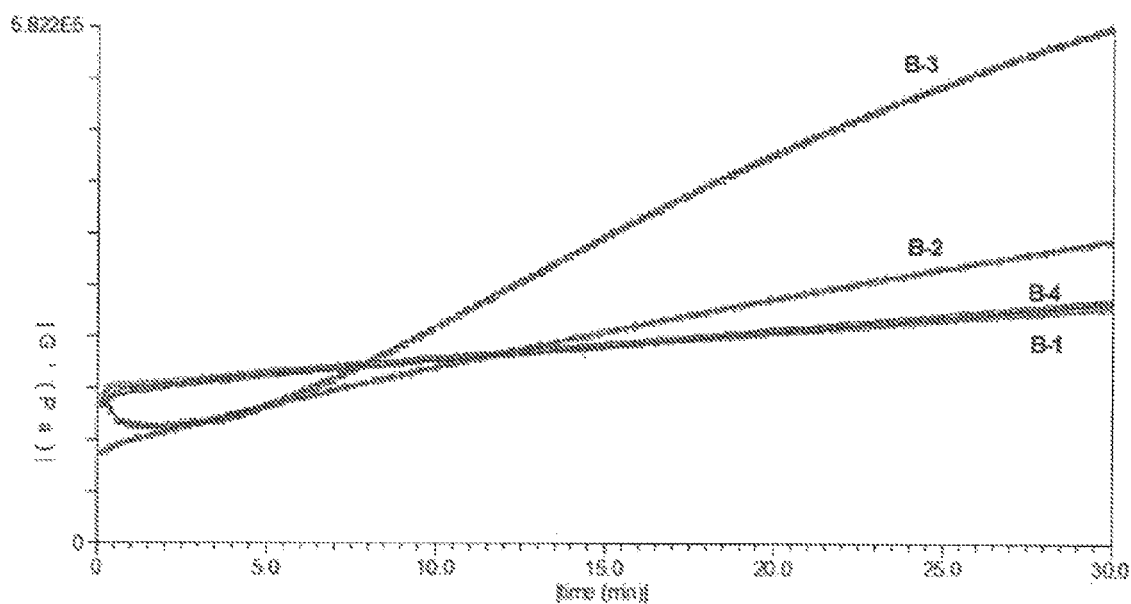

US 9,296,932 B2

ACCELERATED CURE COMPOSITION CONTAINING AN ISOCYANATE FUNCTIONAL PREPOLYMER

CLAIM OF PRIORITY

This application is a national phase filing under 35 USC §371 from PCT Application serial number PCT/US2012/034868 filed on 25 Apr. 2012. Which claims priority from provisional application Ser. No. 61/481,885 filed May 3, 2011 and provisional application Ser. No. 61/587,316 filed Jan. 17, 2012 both incorporated herein by reference in their entirety.

FIELD OF THE INVENTION

The present invention relates to a system for bonding two substrates together comprising one or more isocyanate functional prepolymers and a cure acceleration system. The present invention also comprises a method of using such systems for bonding substrates together.

BACKGROUND OF THE INVENTION

Compositions having isocyanate functional components are utilized to bond substrates together. One common use of such compositions is to bond glass, often in the form of windows, into structures. In automotive assembly plants windows are often bonded in with one part adhesive compositions containing isocyanate functional components. Typically these compositions cure by reaction with ambient moisture. One part adhesives are used because the equipment required to dispense and apply the adhesives is less complex than the equipment used to apply two-part adhesive compositions. The one part moisture curing adhesives typically take several hours to cure. In the assembly plant environment, vehicles are not driven for several hours and this slow curing process is acceptable. One part moisture curing adhesives known in the art are disclosed in U.S. Pat. Nos. 4,374,237; 4,687,533; 4,780,520; 5,063,269; 5,623,044; 5,603,798; 5,852,137; 5,922,809; 5,976,305; 5,852,137 and 6,512,033, relevant portions incorporated herein by reference. Examples of commercial one part adhesives include BETASEAL™ 15630, 15625, 61355 adhesives available from The Dow Chemical Company, EFBOND™ windshield adhesives available from Eftec, WS 151™, WS212™ adhesives available from Yokohama Rubber Company, and SIKAFLEX™ adhesives available from Sika Corporation.

Two-part compositions containing isocyanate functional compounds or prepolymers in one part and compounds and/or prepolymers having isocyanate reactive components in the other part are used in situations where cure speed is important. One such environment is in the automotive aftermarket replacement glass business. Often customers desire that the adhesives cure quickly so that the vehicle can be driven as soon as possible after bonding of the replacement window into the vehicle. The advantage of a two-part adhesive is that the curing reaction proceeds at a much faster reaction rate than does a one part moisture curing adhesive system. Examples of two-part compositions containing isocyanate functional compounds or prepolymers in one part and compounds and/or prepolymers having isocyanate reactive components in the other part are disclosed in EP 1,524,282, U.S. Pat. Nos. 5,852,137; 6,709,539; 7,101,950 and 7,361,292, relevant parts incorporated herein by reference. Some of these two part compositions were developed to allow automobiles with replacement windows to be driven within 30 minutes of bonding the window into the automobile. Some of these adhesives have achieved commercial success. Nevertheless the installers and customers demand even faster systems such as systems that can allow the automobiles to be driven 15 minutes after installation.

Adhesives are utilized in a variety of environments and the properties required in different environments are different. It is desirable that adhesive systems be developed that allow for modification of properties of the cured adhesive to fit the environment of use or the substrates bonded. For instance modification of the relative elasticity and modulus of adhesive is desirable. Often manufacturers desire to handle products as soon as possible to enhance the productivity of their plants. In modern industrial processes, there is a need to move parts and to place, loads on adhesive systems as soon as possible. Thus, adhesives which have a good green strength shortly after application are needed. Typical one part adhesives do not provide such green strength properties. Further, the adhesive systems need a longer open time, the time from application of the adhesive to a substrate until the adhesive can no longer adhere to another substrate, than a typical two-part adhesive allows. An open time of between 8 minutes and 15 minutes is desired. Thus, installers desire fast drive away time and a longer open time to adjust the placement of the window in a vehicle.

Thus, what is needed is an adhesive system which exhibits good green strength, rapid cure rates and the ability to drive automobiles in less than 30 minutes, preferably in about 15 minutes, or to allow substrates to be handled shortly after application of the adhesive system.

SUMMARY OF THE INVENTION

The present invention relates to a composition comprising: a) one or more isocyanate functional prepolymers; and b) one or more compounds containing one or more hydroperoxide groups; wherein components a) and b) are kept separate until cure is desired. The composition can be used in the form of a two part adhesive. The compositions may further comprise one or more of the following ingredients: one or more compounds containing an amine group which reduces the hydroperoxide group so as to form free radicals, wherein the amine containing compound is kept separate from the hydroperoxide group containing compounds until cure is desired; one or more compounds, oligomers or polymers containing one or more acrylate groups; one or more fillers; and one or more plasticizers.

In another embodiment, the invention comprises a method comprising: i) contacting the separated parts of the composition as described herein; ii) contacting the contacted composition of i) with a first substrate; iii) contacting the first substrate with a second substrate with the composition of i) disposed between the two substrates; iv) allowing the composition of i) to cure and bond the two substrates together.

The compositions and methods of the invention allow substrates to be adhered together rapidly. This allows the bonded substrates to be handled or used after short curing times. The compositions properties can be adjusted to fit the requirements of the systems bonded together with the adhesive systems. The compositions exhibit longer open times to facilitate flexibility in bonding substrates, such as windows, to other substrates, such as window openings. Preferably the open time is from about 6 to about 14 minutes. The compositions of the invention may be used to bond similar and dissimilar substrates together, for instance, plastics, glass, wood, ceramics, metal, coated substrates and the like: The compositions are especially useful for bonding glass to other substrates, such as vehicles and buildings, and parts of modular components together, such as vehicle modular components.

DESCRIPTION OF THE DRAWINGS

FIG. 1 is a graph of G' modulus vs. time-after mixing of the compositions of the Examples.

DETAILED DESCRIPTION

The explanations and illustrations presented herein are intended to acquaint others skilled in the art with the invention, its principles, and its practical application. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention relates to a curable composition comprising one of more isocyanate functional prepolymers and one or more compounds containing one or more hydroperoxide groups wherein the two components are kept separate until initiation of cure is desired. The two components can be kept separate by keeping them in separate parts until cure is desired, for instance as a two component system. Alternatively the one or more compounds containing one of more hydroperoxide groups can be encapsulated in an encapsulant to keep the two components separate. The mixture can then be subjected to conditions at which the hydroperoxide compounds are released from the encapsulant so as to contact the compounds with the isocyanate containing prepolymer to intiate cure. Such operations include heating, breaking the capsules mechanically or using shear, and the like. Examples of encapsulating systems and methods for releasing the encapsulated compounds containing one or more hydroperoxide groups are disclosed in Mahdi et al U.S. Pat. No. 6,613,816, Siovoshani et al. U.S. Pat. No. 7,842,146 and Bhat WO 1997/025360 all incorporated herein by reference. The compositions of the invention may further comprise any one or more of the features described in this specification in any combination, including the preferences and examples listed in this specification, and includes the following features: one or more of the ingredients recited herein in any combination; the weight ratio of the one or more compounds containing one or more hydroperoxide groups to the one or more compounds containing one or more amino groups is from about 1.0:1.0 to about 200:1.0; the one or more isocyanate containing prepolymers contain from about 0.1 to about 35 percent by weight of free isocyanate groups; the composition is a two part adhesive; the one or more compounds containing one or more amino groups catalyzes the reaction of isocyanate groups with active hydrogen containing groups; the amino groups are tertiary; the amino groups are cycloaliphatic tertiary amino groups; the composition comprises from about 10 to about 70 percent by weight of one or more isocyanate functional prepolymers; the composition comprises from about 30 to about 55 percent by weight of one or more isocyanate functional prepolymers; the composition comprises from about 0.05 to about 20.0 percent by weight of one or more compounds containing one or more amino groups; the composition comprises from about 0.10 to about 5.0 percent by weight of one or more compounds containing one or more amino groups; the composition comprises from about 0.05 to about 5 percent by weight of one or more compounds containing one or more hydroperoxide groups; the composition comprises from about 0.10 to about 2.0 percent by weight of one or more compounds containing one or more hydroperoxide groups; the composition comprises from about 0 to about 70 percent by weight of one or more compounds containing one or more acrylate groups; the composition comprises from about 5 to about 20 percent by weight of one or more compounds containing one or more acrylate groups; the one or more fillers are present in an amount of about 1 to about 40 percent by weight; the composition comprises wherein the one or more plasticizers are present in an amount of about 5 to about 35 percent by weight; the composition exhibits a G' modulus of 0.5 MPa or greater fifteen minutes after contacting the separated parts of the composition; the composition is tested on a substrate of glass, transparent plastic, wherein the glass or transparent plastic may have an organic or ceramic enamel frit located about the periphery of the glass or transparent plastic, and/or plastic or metal which may be coated; and wherein the composition is tested on a substrate of glass, transparent plastic, wherein the glass or transparent plastic may have an organic or ceramic enamel frit located about the periphery of the glass or transparent plastic, and a substrate of coated plastic or metal. The method of the invention may further comprise any one or more of the features described in this specification in any combination including the preferences and examples listed in this specification and the composition features as described in this paragraph and includes the following features: the two parts are mixed before contacting with the first substrate; and after step iii) the contacted substrates are exposed to elevated temperatures to accelerate the cure of the composition of i).

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw materials, incomplete conversion of the reactants and formation of by-products. Durability in this context means that the composition once cured remains sufficiently strong to perform its designed function, in the embodiment wherein the cured composition is an adhesive, the adhesive holds substrates together for the life or most of the life of the structure containing the cured composition. As an indicator of durability, the curable composition (e.g. adhesive) preferably exhibits excellent results during accelerated aging. Preferably this means that after a set of substrates bonded with the composition of the invention is exposed to heat aging, the failure mode in Quick Knife adhesion or Lap Shear testing is cohesive, meaning the composition breaks before the bond of the composition to the substrate breaks. Isocyanate content means the weight percent of isocyanate groups in the designated component, such as prepolymer, which can be measured by analytical techniques known to one skilled in the art, for example by potentiometric titration with an active hydrogen containing compound, such as dibutyl amine. The free acrylate content means the weight percent of acrylate groups available for reaction in the designated component. Residual content of a component refers to the amount of the component present in free form or reacted with another material, such as an adduct or a prepolymer. The residual content of a component can be calculated from the ingredients utilized to prepare the component or composition or can be determined utilizing known analytical techniques. Heteroatom means nitrogen, oxygen, sulfur and phosphorus, more preferred heteroatoms include nitrogen and oxygen. Hydrocarbyl refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. As used herein percent by weight or parts by weight refer to, or are based on, the weight or the curable compositions unless otherwise specified. The term isocyanate-reactive compound as used herein includes any organic compound having nominally at least two isocyanate-reactive moieties. For the purposes of this invention, an isocyanate reactive moiety, an active hydrogen containing moiety, refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such isocyanate reactive moieites, such as active hydrogen moieties, are —COOH, —OH, —NH$_2$, —NH—, —CONH$_2$—, —SH, and —CONH—. Preferable active hydrogen containing compounds include polyols, polyamines, polymercaptans and polyacids, more preferably polyols, and most preferably polyether polyols.

The compositions relate to reactive systems containing isocyanate functional prepolymers which are curable. Reactive means that the curable compositions (e.g. adhesive) contain components which react to form a polymeric matrix that is set irreversibly once cured. The curable systems are preferably two part systems. The curable systems may be useful as adhesives. An isocyanate functional prepolymer contains on average more than one isocyanate functional group per molecule, and preferably about two or more isocyanate functional groups per molecule. The isocyanate prepolymer can by any prepolymer prepared by reaction of an isocyanate functional compound with one or more compounds having on average more than one isocyanate reactive functional groups (such as hydroxyl, amine, thiol, carboxyl and the like), under conditions such that the prepolymer prepared have on average more than one, preferably on average two or more isocyanate moieties (groups) per molecule. The isocyanate functional component is present in the curable composition in a sufficient amount to form a cured component when exposed to curing conditions and where utilized as an adhesive for the composition to bond to the target substrate. In curable compositions, the isocyanate functional prepolymer when combined with the one or more compounds containing one or more hydroperoxide groups, and optionally one or more isocyanate reactive compounds, is capable of bonding substrates together in a manner that the substrates remain bound together when exposed to temperatures of about −30° C. to about 100° C. for long periods of time, such as 10 years; and up to temperatures of about 180° C. for short periods of up to 30 minutes.

In a one-part system, the isocyanate functional prepolymer may be combined with encapsulated compounds containing one or more hydroperoxide groups as described hereinafter. The one component adhesive systems initiate cure by causing the compounds containing one or more hydroperoxide groups to come into contact with the isocyanate functional prepolymer. Once formulated the one-part adhesive systems are packaged in air and moisture proof containers to prevent curing before application.

The curable system may be a two-part isocyanate functional prepolymer containing system. The two parts are reactive with one another and when contacted undergo a curing reaction. One part of the composition comprises, or contains, an isocyanate functional prepolymer. This is typically referred to as the resin side or A side. The other component of the composition comprises one or more compounds containing one or more hydroperoxide groups, and optionally one or more isocyanate reactive compounds. An isocyanate reactive component comprises, or contains, one or more compounds, oligomers or prepolymers having on average more than one group reactive with isocyanate moieties. The second part is commonly known as the curative or B side. Compounds having on average one or more isocyanate reactive groups can be prepolymers or can be small chain compounds such as difunctional chain extenders or polyfunctional crosslinking agents known in the art. Typically, the chain extenders and crosslinking agents have a molecular weight of about 250 Daltons or less. The reaction product is a cured product which is capable of bonding certain substrates together. In two part compositions, the one or more isocyanate functional prepolymers are preferably kept separate from the one or more compounds containing one or more hydroperoxide groups. Preferably the one or more isocyanate functional prepolymers; and one or more compounds containing one or more amino groups, where present, are located in the resin or A side. Preferably the one or more compounds containing one or more hydroperoxide groups are located in the curative or B) side. Preferably the resin or A) side is packaged and stored in a moisture proof container prior to use to prevent undesirable curing of the prepolymer. The curative or B) side may also be so packaged. The one or more acrylate containing monomers, oligomers or polymers may be located in either part, or both parts, of a two part composition and can be used to adjust the volume of the parts.

The isocyanate functional prepolymers have an average isocyanate functionality sufficient to allow the preparation of a crosslinked polyurethane upon cure and not so high that the polymers are unstable. The prepolymers are prepared by reacting one or more polyisocyanates with one or more compounds containing on average more than one isocyanate reactive group per molecule. The prepolymer preferably has a free isocyanate content which facilitates acceptable strength in the compositions prepared from the prepolymers, preferably after 30 minutes, more preferably after 15 minutes and after 24 hours. In one part adhesive compositions the free isocyanate content is preferably about 0.1 percent by weight or greater based on the weight of the prepolymer, more preferably about 1.2 percent by weight or greater, even more preferably about 1.4 percent by weight or greater, and most preferably about 1.6 percent by weight or greater. In one part adhesive compositions the isocyanate content in the prepolymers is preferably about 10 percent or less based on the weight of the prepolymer, more preferably about 5.0 percent or less, even more preferably about 3.0 percent or less, even more preferably about 2.2 percent by weight or less, even more preferably about 2.0 or less, and most preferably about 1.8 percent by weight or less. For two-part isocyanate based curable systems, the isocyanate content in the prepolymers is preferably about 1 percent by weight or greater based on the weight of the prepolymer, more preferably about 2 percent by weight or greater, even more preferably about 6 percent or greater, even more preferably about 8 percent by weight or greater and most preferably about 10 percent by weight or greater. For two-part isocyanate based compositions, the isocyanate content in the prepolymers is preferably about 35 percent by weight or less based on the weight of the prepolymer, more preferably about 25 percent by weight or less, even more preferably about 20 percent by weight and most preferably about 15 percent by weight or less.

Preferably, the polyisocyanates for use in preparing the prepolymer include any aliphatic, cycloaliphatic, araliphatic, heterocyclic or aromatic polyisocyanate, or mixtures thereof. Preferably, the polyisocyanates used have an average isocyanate functionality of about 2.0 or greater and an equivalent weight of about 80 or greater. Preferably, the isocyanate functionality of the polyisocyanate is about 2.0 or greater, more preferably about 2.2 or greater, and is most preferably about 2.4 or greater; and is preferably about 4.0 or less, more preferably about 3.5 or less; and most preferably about 3.0 or less. Higher functionality may also be used, but may cause excessive cross-linking, and result in a composition which is too viscous to handle and apply easily, and can cause the cured composition to be too brittle. Preferably, the equivalent weight of the polyisocyanate is about 80 or greater, more preferably about 110 or greater, and is most preferably about 120 or greater; and is preferably about 300 or less, more preferably about 250 or less, and most preferably about 200 or less. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexamethylene diisocyanate. The most preferred isocyanate is diphenylmethane diisocyanate. The amount of isocyanate containing compound used to prepare the prepolymer is that amount that gives the desired properties, that is, the appropriate free isocyanate content as discussed hereinbefore and viscosities suitable for application. Preferably the isocyanate functional prepolymers are the reaction product of one or more polyisocyanates and one or more isocyanate reactive compounds wherein an excess of polyisocyanate is present on an equivalents basis. Preferably, the isocyanates are used to prepare the prepolymer in an amount of about 1.3 equivalents of isocyanate (NCO) per equivalent of isocyanate reactive compound or greater, more preferably about 1.4 equivalents of isocyanate or greater and most preferably about 1.5 equivalents of isocyanate or greater. Preferably, the polyisocyanates used to prepare the prepolymer are used in an amount of about 2.0 equivalents of isocyanate per equivalent of isocyanate reactive compound or less, more preferably 1.8 equivalents of isocyanate or less and most preferably about 1.6 equivalents of isocyanate or less.

Preferably the isocyanate functional prepolymers are the reaction product of one or more polyisocyanates with one or more compounds having more than one, preferably two or more, isocyanate reactive groups, for example, active hydrogen containing functional groups wherein an excess of polyisocyanate is present on an equivalents basis. A preferred class of such compounds includes polyols, preferably a mixture of one or more polyether diols and/or one or more polyether triols. The diols and triols are generically referred to as polyols. Preferably, polyols useful in the preparation of the prepolymers include those disclosed in Wu, U.S. Pat. No. 6,512,033 at column 4, line 10 to line 64, incorporated herein by reference, and include polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each of the alkylene oxides. In some preferred embodiments, the polyol comprises propylene oxide chains with ethylene oxide chains capping the polyol. Preferably the ethylene oxide capped polypropylene oxides are hydrophobic, and preferably contain less than about 20 mole percent of ethylene oxide and more preferably less than 10 mole percent of ethylene oxide in the backbone. In some preferred embodiments, the polyols are a mixture of diols and triols. Preferably, the isocyanate-reactive compound has a functionality about 1.8 or greater, more preferably about 1.9 or greater, and is most preferably about 1.95 or greater; and is preferably about 4.0 or less, more preferably about 3.5 or less, and is most preferably about 10 or less. Preferably, the equivalent weight of the isocyanate-reactive compound is about 200 or greater, more preferably about 500 or greater, and is more preferably about 1,000 or greater; and is preferably about 5,000 or less, more preferably about 3,000 or less, and is most preferably about 2,500 or less. The isocyanate reactive compounds are present in an amount sufficient to react with most of the isocyanate, groups of the isocyanates leaving enough isocyanate groups to correspond with the desired free isocyanate content of the prepolymer. Preferably, the isocyanate reactive compounds are present in an amount of about 50 parts by weight or greater based on the prepolymer, more preferably about 65 parts by weight or greater and most preferably about 80 parts by weight or greater. Preferably, the isocyanate reactive compounds are present in an amount of about 90 parts by weight or less based on the prepolymer and most preferably about 85 parts by weight or less.

In some embodiments, the compositions further comprise one or more prepolymers containing one or more organic based polymers dispersed therein. Preferably, the organic based polymer is included in the prepolymer by inclusion of a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference. Preferably, the triols, used to disperse the organic particles is one or more polyether triols and more preferably one, or more polyoxyalkylene based triols. Preferably, such polyoxyalkylene oxide triols comprise polyoxypropylene chains with a polyoxyethylene end caps. In some preferred embodiments, the prepolymer also comprises a dispersion triol having dispersed therein particles of an organic based polymer. Preferably, the particles dispersed in the dispersion triol comprise one or more of thermoplastic polymers, rubber-modified thermoplastic polymers or a polyureas dispersed in one or more triols. Preferably such dispersion triol based prepolymers are contained in the adhesive in an amount of about 5 percent by weight or less.

The isocyanate functional prepolymers may contain alkoxy silane moieties. All of the isocyanate functional prepolymers used in the adhesive may contain alkoxysilane moieties or such prepolymers may be blended with one or more isocyanate functional prepolymers which do not contain alkoxy silane moieties. The isocyanate functional prepolymers may contain sufficient alkoxy silane moieties to improve the adhesion to substrates, for instance glass and coated substrates. The alkoxy silane content in the prepolymers is preferably about 0.1 percent by weight or greater, more preferably about 0.4 percent by weight or greater and most preferably about 0.8 percent by weight or greater. The alkoxy silane content in the prepolymers is preferably about 3.0 percent by weight or less, more preferably about 2.0 percent by weight or less and most preferably about 1.0 percent by weight or less. "Alkoxy silane content" means the weight percentage of alkoxy silane moieties based on the total weight of the prepolymer.

The isocyanate functional prepolymers may comprise free acrylate groups. Free acrylate groups may be incorporated into the isocyanate functional prepolymers by reacting a portion of terminal isocyanate groups with one of more compounds containing one or more active hydrogen containing groups and one or more acrylate groups. Where the one or more compounds containing one or more active hydrogen containing groups and one or more acrylate groups has only one active hydrogen containing group, the acrylate groups will be located on the end of the polymer chains. Where the one of more compounds containing one or more active hydrogen containing groups and one or more acrylate groups have more than one active hydrogen containing groups, the acrylate groups may be pendant from the backbone of the prepolymer or located at the end of the polymer chains based on the equivalents ratio of active hydrogen containing groups to isocyanate groups. Where the one or more compounds containing one or more active hydrogen containing groups and one or more acrylate groups have two or more active hydrogen groups, most of the acrylate groups will be located pendant from the backbone of the chain. Where there is an excess of isocyanate groups in the reaction mixture the prepolymer will have most, if not substantially all (greater than about 99 percent by weight) of the terminal groups as isocyanate groups. If there is less than an excess of isocyanate groups, the prepolymers will have a mix of isocyanate and acrylate groups as terminal groups. It is preferred that there be a low amount of active hydrogen containing groups at the terminus of the prepolymers as this could negatively impact the stability of the prepolymer. The free isocyanate content of the prepolymer is selected to provide the desired properties of the composition with respect to cohesive strength, elasticity and adhesive strength. The acrylate content is chosen to provide the desired cure speed as measured by lap shear strength at a specified time and modulus as described hereinbefore. The ratio of free isocyanate content and free acrylate content is chosen to give the desired balance of properties and will be impacted by the presence of other components in the composition. Preferably the acrylate content is about 1.0 percent by weight or greater based on the weight of the prepolymer, more preferably about 5.0 or greater, even more preferably about 10 percent by weight or greater and most preferably about 15 percent by weight or greater. Preferably the acrylate content is about 60 percent by weight or less based on the weight of the prepolymer, more preferably about 40 percent by weight or less, even more preferably about 30 percent by weight or less and most preferably about 20 percent by weight or less.

The one or more compounds containing one or more active hydrogen containing groups and one or more acrylate groups can be any compound, adduct, oligomer or prepolymer containing one of more compounds containing one or more active hydrogen containing groups and one or more acrylate groups. The active hydrogen groups can be any active hydrogen containing groups as described herein. Preferred active hydrogen groups include amino, hydroxyl and thiol groups, even more preferably amino and hydroxyl groups, with hydroxyl most preferred. Preferably the one of more compounds containing one or more active hydrogen containing groups and one or more acrylate groups correspond to the formula

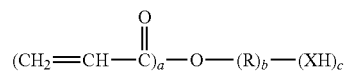

wherein: R is separately in each occurrence a hydrocarbylene group, optionally containing one or more heteroatoms; X is separately in each occurrence $NR^2$, O or S; $R^2$ is separately in each occurrence hydrogen or a hydrocarbyl group, optionally containing one or more heteroatoms; a is separately in each occurrence an integer of from about 1 to 6; b is separately in each occurrence 0 or 1; and c is separately in each occurrence an integer of from about 1 to 6. R is preferably $C_{1-30}$ hydrocarbylene optionally containing one or more heteroatoms; more preferably $C_{1-200}$ alkylene, alkynylene, alkynylene, arylene, cycloalkyene, cycloalkenylene, alkarylene, or aralkylene groups or a $C_{4-30}$ polyalkylene polyether, even more preferably $C_{1-20}$ alkarylene, alkylene or cycloalkylene or $C_{4-30}$ polylkylene ether; and most preferably a $C_{2-6}$ alkylene group, $C_{13-20}$ alkyl bridged biphenylene group or $C_{4-30}$ polyalkylene polyol. $R^2$ is preferably in each occurrence a $C_{1-13}$ alkyl group, $C_{6-12}$ aryl or alkaryl group and most preferably $C_{1-4}$ alkyl or phenyl. X is preferably O or NH and most preferably O. Preferably, a is separately in each occurrence 1 to 4, even more preferably 1 to 2, and most preferably 1. Preferably, c is separately in each occurrence 1 to 4 and most preferably 1 to 2. Exemplary compounds containing one or more active hydrogen containing groups and one or more acrylate groups include, but are not limited to, hydroxyethyl acrylate, hydroxyethyl methacrylate, aminoethyl methacrylate, 3-hydroxypropyl methacrylate, aminopropyl methacrylate, hydroxyhexyl acrylate, t-butylamino ethyl methacrylate, hydroxy octyl methacrylate, hydroxybutyl methacrylate, hydroxybutyl acrylate, 3-hydroxypentyl acrylate, 6-hydroxynonyl acrylate, 3-hydroxypropyl methacrylate, 2-hydroxypentyl methacrylate, 5-hydroxypentyl methacrylate, 7-hydroxyheptyl methacrylate, 5-hydroxydecyl methacrylate, N-hydroxymethyl acrylamide, N-hydroxymethyl methacrylamide, diethylene glycol monoacrylate, diethylene glycol monomethacrylate, glycerin dimethacrylate, tri-methylol propane dimethacrylate, alkoxylated hydroxyethyl acrylate, trimethylolpropane diacrylate, alkoxylated trimethylolpropane diacrylate, reaction products of polyether glycols of acrylic or methacrylic acid, the monoacrylate or monomethacrylate esters of bisphenol-A, the fully hydrogenated derivative of bisphenol-A, cyclohexyl diol, and the like. More preferably the compounds containing one or more active hydrogen containing groups and one or more acrylate groups include hydroxymethyl(meth)acrylate, 2-hydroxyethyl hydroxyethyl(meth)acrylate, hydroxyl-propyl(meth) acrylate, and 2-hydroxy propyl(meth)acrylate. The compounds containing one or more active hydrogen containing groups and one or more acrylate groups are utilized in a sufficient amount to prepare prepolymers having the desired free acrylate content or when added to the composition separately to achieve the desired acrylate content in the composition as described herein.

The prepolymers may be prepared by any suitable method, such as bulk polymerization and solution polymerization. The reaction to prepare the prepolymers is carried out under anhydrous conditions, preferably under an inert atmosphere such as a nitrogen blanket and to prevent crosslinking of the isocyanate groups by atmospheric moisture. The reaction is preferably carried out at a temperature from about 0° C. to about 150° C., more preferably from about 25° C. to about 90° C., until the residual isocyanate content determined by titration of a sample is very close to the desired theoretical value. The reactions to prepare the prepolymer may be carried out in the presence of urethane catalysts, such as stannous salts of carboxylic acids, (stannous octoate, stannous oleate, stannous acetate, and stannous laurate); dialkyltin dicarboxylates, (dibutyltin dilaurate and dibutyltin diacetate); tertiary amines and tin mercaptides. The amount of catalyst employed is between about 0.005 and about 5 parts by weight of the mixture. Preferably, the reaction is carried out in admixture with a plasticizer.

The one or more isocyanate functional prepolymers are present in sufficient quantity to provide cohesive strength, and in adhesive uses, adhesive character to the composition. The isocyanate functional prepolymer is present in the curable composition in a sufficient amount to form a cured component when exposed to curing conditions and where utilized as an adhesive for the composition to bond to a target substrate. In curable compositions, the isocyanate functional prepolymer when combined with the one or more compounds containing one or more hydroperoxide groups, and optionally one or more isocyanate reactive compounds, is capable of bonding substrates together in a manner that the substrates remain bound together when exposed to temperatures of about −30° C. to about 100° C. for long periods of time, such as 10 years; and up to temperatures of about 180° C. for short periods of up to 30 minutes. Preferably, the isocyanate functional prepolymer is present in an amount of about 10 percent by weight or greater based on the weight of the composition, more preferably about 30 percent by weight or greater and most preferably about 50 percent by weight or greater. Preferably, the isocyanate functional prepolymer is present in an amount of about 70 percent by weight or less based on the weight of the composition, more preferably about 60 percent by weight or less and most preferably about 55 percent by weight or less.

The composition of the invention further comprises one or more compounds containing one or more hydroperoxide groups (—O—O—H) which generate free radicals when contacted with isocyanate groups, such as those contained in the isocyanate functional prepolymers. Preferably, the one or more compounds containing one or more hydroperoxide groups generate free radicals when contacted with compounds containing amino groups. Hydroperoxides which may be decomposed according to the invention include compounds having the formula $R^3OOH$, where $R^3$ is an organic radical. Preferably organic radicals are hydrocarbyl groups. Exemplary hydrocarbyl groups include a straight or branched chain alkyl or cycloalkyl group containing 2 to 15 carbon atoms, an aryl group, such as a monocyclic or polycyclic group, in which the cyclic groups may optionally be substituted with one or more substituents inert to the decomposition reaction, such as alkyl or alkoxy, containing 1 to 7 carbon atoms, or an alkaryl group in which the alkyl chain contains from 1 to 15 carbon atoms and the aryl group is as above described. Preferably, $R^3$ is an alkyl or cycloalkyl group containing 4 to 12 carbon atoms or an alkaryl group in which the aromatic moiety is phenyl and the alkyl substitutent is straight or branched chain alkyl or cycloalkyl containing up to about 6 carbon atoms. Preferred classes of compounds containing one or more hydroperoxide groups include ketone hydroperoxides, alkyl hydroperoxides, aryl hydroperoxides, and alkyl substituted aryl hydroperoxides. Exemplary compounds containing one or more hydroperoxide groups include hydroperoxide, tertiary butyl hydroperoxide, methyl ethyl ketone hydroperoxide, isopentane hydroperoxide, cyclohexyl hydroperoxide, isobutyl hydroproxide, isoamyl hydroperoxide, 2-methylbutyl-2-hydroperoxide, alpha- and beta-ethylbenzene hydroperoxide, phenethyl hydroperoxide, cyclohexylphenyl hydroperoxide and the like. The one or more compounds containing one or more hydroperoxide groups are present in sufficient amount to initiate cure of the curable composition. Preferably the one or more compounds containing one or more hydroperoxide groups are present in an amount of about 0.05 percent by weight or greater based on the weight of the curable composition, more preferably about 0.1 percent by weight or greater and most preferably about 0.5 percent by weight or greater. Preferably, the one or more compounds containing one or more hydroperoxide groups are present in an amount of about 5.0 percent by weight or less based on the weight of the curable composition, more preferably about 2.0 percent by weight or less and most preferably about 1.0 percent by weight or less.

The compositions may further comprise one or more compounds containing one or more amino groups. Any compound containing one or more amino groups which causes the hydroperoxide compounds to decompose and form free radicals, catalyzes the reaction of isocyanate groups with isocyanate reactive compounds, or both may be used. Preferably the amino group containing compounds comprise one or more tertiary amines. Preferably the amino group containing compounds comprise one or more cycloaliphatic tertiary amines. In an embodiment wherein the curable composition is a two part composition, the one or more compounds containing one or more amino groups are located in one part and the hydroperoxide containing compound is located in the other part. Exemplary tertiary amines are dimorpholino dialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine, and mixtures thereof. Exemplary compounds containing one or more cycloaliphatic tertiary amines include dimorpholino dialkyl ethers. Preferred are the dimorpholino dialkyl ethers including dimorpholino diethyl ether and di(dialkylmorpholino) dialkyl ethers such as di(dimethylmorpholino) diethyl ether. The one or more compounds containing one or more amino groups are preferably present in a composition in sufficient amount to initiate decomposition of the hydroperoxide and form free radicals when contacted with one or more hydroperoxide group containing compounds and/or to catalyze the reaction of isocyanate groups with isocyanate reactive groups. The one or more compounds containing one or more amino groups are present in an amount of about 0.05 percent by weight or greater based on the weight of the curable composition, more preferably about 0.1 percent by weight or greater and most preferably about 0.5 percent by weight or greater. The one or more compounds containing amino groups are preferably present in an amount of about 20 percent by weight or less based on the weight of the curable composition, more preferably about 5.0 percent by weight or less and most preferably about 1.0 percent by weight or less.

In some embodiments all of the ingredients except the hydroperoxide may be located in one part and mixed with the other ingredients just before application. In another embodiment the curative B side may comprise a isocyanate reactive group containing monomer, oligomer or polymer, preferably containing hydroxyl groups. The resin A side and the curative B side may be mixed just before application. Such mixing can be achieved by any means known in the art.

The equivalents ratio of the one or more compounds containing one or more hydroperoxide groups to the one or more compounds containing one or more amino groups is chosen such that the composition cures with reasonable speed, such as to function as an adhesive which is capable of holding the substrates together under anticipated use conditions, preferably for a significant part or the entire anticipated life of the product. Preferably the equivalents ratio of the one or more compounds containing one or more hydroperoxide groups to the one or more compounds containing one or more amino groups is about 1.0:1.0 or greater and more preferably about 50.0:1.0 or greater. Preferably the equivalents ratio of the one or more compounds containing one or more hydroperoxide groups to the one or more compounds containing one or more amino groups is about 200:1.0 or less and more preferably about 100:1.0 or less. Equivalents ratio means the ratio of reactive groups of the recited compounds, for instance ratio of hydroperoxide groups to amino groups.

The composition may contain acrylate containing monomers, oligomers or prepolymers. The choice of components is based on the ultimate properties, desired in the cured adhesive. Any acrylate containing monomers, oligomers or prepolymers which provide the desired properties, cure rate and modulus may be utilized. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine acrylates, acrylic acrylates, amido and spiro ortho carbonate esters or mixtures thereof. A more preferred class of oligomers and prepolymers are the aliphatic urethane acrylates. Examples of aliphatic urethane acrylate oligomers or prepolymers which are commercially available include those from Cytec Surface Specialties under the trademark EBECRYL and designations 264, 265, 284N, 1290, 4866, 8210, 8301, 8402, 8405, 5129 and 8411; those available from Sartomer under the designations CN985B88, 964, 944B85, 963B80, CN 929, CN 996, CN 968, CN 980, CN 981, CN 982B90, CN 983, CN991; CN 2920, CN 2921, CN 9006, CN 9008; CN 9009, CN 9010; GENOMER 4302 and 4316 available from Rahn; PHOTOMER 6892 and 6008 available from Cognis; NK OLIGO™ U24A and U-15HA™ available from Kowa. Aliphatic urethane acrylates include the BR series of aliphatic urethane acrylates such as BR 144 or 970 available from Bomar Specialties or the LAROMER series of aliphatic urethane acrylates from BASF. The acrylate compounds may be monomeric in nature. Exemplary monomeric compounds include octyl(meth)acrylate, nonylphenol ethoxylate(meth)acrylate, isononyl(meth)acrylate, isobornyl(meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, isodecyl(meth)acrylate, dodecyl(meth)acrylate, n-butyl(meth)acrylate, methyl(meth)acrlate, hexyl(meth)acrylate, (meth)acrylic acid, stearyl (meth)acrylate, hydroxy functional caprolactone ester(meth)acrylate, isooctyl(meth)acrylate, hydroxyethyl(meth)acrylate, hydroxymethyl(meth)acrylate, hydroxypropyl (meth)acrylate, hydroxyisopropyl(meth)acrylate, hydroxybutyl(meth)acrylate, hydroxyisobutyl(meth)acrylate, tetrahydrofurfuryl(meth)acrylate, 2-(2-oxy)ethyl acrylate, 2-phenoxy ethyl acrylate, hydroxyl ethyl acrylate, other long chain alkyl acrylates, isobornyl acrylate, cyclic trimethylol propane formal acrylate, monofunctional aliphatic urethane acrylates, ethylene glycol di(meth)acrylate, hexanediol di(meth)acrylate, triethylene glycol di(meth)acrylate, tetraethylene glycol di(meth)acrylate, di propylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, tris(2-hydroxyl-ethyl)isocyanurate triacrylate ditrimethylolpropane tetra(meth)acrylate, and alkoxylated polyol derived di or polyacrylates, such as propoxylated neopentyl glycol diacrylate or propoxylated glycol triacrylate, neopentyl glycol di meth)acrylate, diacrylates such as 1,6 hexanediol diacrylate, 1,9 nonanediol diacrylate, 1,4 butanediol acrylate, tricyclodecane dimethanol diacrylate, cyclohexane dimethanol diacrylate, alkoxylated cyclohexane diacrylates, tripropylene glycol diacrylate and the like. The most preferred acrylate and methacrylate compounds include methylmethacrylate, butylmethacrylate, 2-ethylhexylmethacrylate, tetrahydrofurfuryl methacrylate and cyclohexylmethylmethacrylate. The amount of the acylate containing component is chosen to provide the acrylate content described hereinbefore and to provide the cure rate and modulus described hereinbefore. Preferably the acrylate monomers, oligomers or polymers are present in an amount of about 1 percent by weight or greater based on the weight of the curable composition, more preferably about 5 percent by weight or greater and most preferably about 10 percent by weight or greater. Preferably, the acrylate monomers, oligomers or polymers are present in an amount of about 70 percent by weight or less based on the weight of the curable composition, more preferably about 60 percent by weight or less, even more preferably about 50 percent by weight or less, even more preferably about 40 percent by weight or less and preferably about 20 percent by weight or less.

The acrylate containing components may comprise one or more adducts of one or more polyisocyanates and one or more compounds containing one or more acrylate groups and one or more active hydrogen containing groups. Such adducts contain isocyanate groups and acrylate groups. Both the isocyanate and the acrylate groups participate in the cure of the adhesives of the invention. The isocyanate groups form urea or urethane linkages and the acrylates polymerize via free radical polymerization. The adducts can provide all or a portion of the acrylate groups needed to speed cure and enhance modulus of the cured product. The adducts are prepared by contacting one or more compounds containing one or more acrylate groups and one or more active hydrogen containing groups and one or more polyisocyanates under conditions such that the adducts are prepared having both isocyanate and acrylate groups. The polyisocyanates described hereinbefore are useful in the preparation of the adducts. The compounds containing one or more acrylate groups and one or more active hydrogen containing groups are useful in the preparation of the adducts. The conditions utilized for the formation of the adducts are similar to the conditions used to prepare isocyanate functional prepolymers, except that the reaction temperature is about 50° C. to about 60° C., for example: 54° C. The equivalents ratio of the one or more polyisocyanates and one or more compounds containing one or more acrylate groups and one or more active hydrogen containing groups reacted is chosen to result in an adduct having both isocyanate and acrylate groups.

The composition preferably contains one or more plasticizers to modify rheological properties to a desired consistency. Such materials should be free of water, inert to isocyanate groups and compatible with the prepolymer. Such material may be added to the reaction mixtures for preparing the prepolymer, or to the mixture for preparing the final composition, preferably to the reaction mixtures for preparing the prepolymer and the adduct, to improve mixing and handling. Exemplary plasticizers include straight and branched alkylphthalates, such as diisononyl phthalate; dioctyl phthalate and dibutyl phthalate, partially hydrogenated terpenes commercially available as "HB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is sufficient to give the desired rheological properties and disperse the components in the composition. Preferably, the plasticizer is present in the compositions in an amount of about 0 part by weight or greater, more preferably about 5 percent by weight or greater and most preferably about 10 percent by weight or greater. The plasticizer is preferably present in an amount of about 35 percent by weight or less and most preferably about 25 percent by weight or less. The plasticizer may be present in one or both parts of a two part composition. Preferably plasticizer is present in the part with the isocyanate functional prepolymers.

The composition may include reinforcing fillers. Such fillers are well-known to those skilled in the art and include carbon black, titanium dioxide, calcium carbonate, surface treated silica, titanium oxide, fumed silica, and talc. Preferred reinforcing fillers comprise carbon black. More than one reinforcing filler may be used, wherein one is carbon black in sufficient amount to color to the composition black. Preferably, the only reinforcing filler used is carbon black. The reinforcing fillers are used in a sufficient amount to increase the strength of the composition and to provide thixotropic properties to the composition. Preferably, the reinforcing filler is present in an amount of about 1 percent by weight of the composition or greater, more preferably about 15 percent by weight or greater and most preferably about 20 percent by weight or greater. Preferably, the reinforcing filler is present in an amount of about 40 percent by weight of the composition or less, more preferably about 35 percent by weight or less and most preferably about 33 percent by weight or less. Among optional materials in the composition are clays. Preferred clays useful include kaolin, surface treated kaolin, calcined kaolin, aluminum silicates and surface treated anhydrous aluminum silicates. The clays can be used in any form which facilitates formulation of a pumpable composition, preferably in the form of pulverized powders, spray dried beads or finely ground particles. Clays may be used in an amount of about 0 percent by weight of the composition or greater, more preferably about 1 percent by weight or greater and even more preferably about 6 percent by weight or greater. Preferably, the clays are used in an amount of about 20 percent by weight or less of the composition and more preferably about 15 percent by weight or less.

The composition may further comprise an adhesion promoter, such as those disclosed in Mandi, U.S. Patent Publication 2002/0100550 paragraphs 0055 to 0065 and Hsieh, U.S. Pat. No. 6,015,475 column 5, line 27 to column 6, line 41 incorporated herein by reference. Preferably the adhesion promoter contains a siloxane present in some form. Preferable methods of including siloxane functionality in the curable formulations are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the prepolymer. In some embodiments the silane has one or more active hydrogen atom which are reactive with an isocyanate. Preferably such silane is a mercapto-silane or an aminosilane and more preferably is a mercapto-trialkoxy-silane or an amino-trialkoxy silane. In some embodiments, the silanes having, active hydrogen atoms reactive with isocyanate moieties, can be reacted with the terminal isocyanate moieties of the prepolymer. Such reaction products are disclosed in U.S. Pat. Nos. 4,374,237 and 4,345,053 relevant parts incorporated herein by reference In other embodiments, silanes having reactive hydrogen moieties reactive with isocyanate moieties can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). The adduct level in the compositions is preferably in the range of about 0.5 percent to about 20 percent, more preferably in the range of about 1.0 percent to about 10 percent and most preferably in the range of about 2.0 percent to about 7 percent. The adduct may be prepared by any suitable method, such as, for example, by reacting an secondary amino- or mercapto-alkoxy silane with a polyisocyanate compound. Suitable polyisocyanates for use in preparing, the adduct include those described above as suitable for use in preparing the prepolymer, particularly including isophorone diisocyanate, polymethylene polyphenylisocyanates, and aliphatic polyisocyanate such as hexamethylene diisocyanate. Preferably, the polyisocyanate is an aliphatic polyisocyanate and is most preferably an aliphatic polyisocyanate based on hexamethylene diisocyante. The polyisocyanate used to prepare the isocyanate silane adduct preferably has a molecular weight of less than about 2,000, more preferably less than about 1,000. Suitable organofunctional silanes include amino- or mercapto-alkoxy silanes. Examples of such compounds include: N,N-bis[(3-triethoxysilyl) propyl]amine; N,N-bis[(3-tripropoxy-silyl) propyl]amine; N-(3-trimethoxysilyl) propyl-3-[N-(3-trimethoxysilyl)-propyl amino]propionamide; N-(3-triethoxysilyppropyl-3-[N-3-triethoxysilyl)-propyl-amino]propion amide; N-(3-trimethoxysilyl)propyl-3-[N-3-triethoxysilyl)-propylamino]propionamide; 3-trimethoxysilylpropyl 3-[N-(3-trimethoxysilyl)-propylamino]-2-methyl propionate; 3-triethoxysilyl propyl 3-[N-(3-triethoxysilyl)-propylamino]-2-methyl propionate; 3-trimethoxysilylpropyl 3-[N-(3-triethoxysilyl)-propylamino]-2-methyl propionate; and the like. Preferably the organo functional silane is gamma-mercaptopropyl-trimethoxysilane (available as A189 from Union Carbide) or N,N'-bis((3-trimethoxysilyl)propyl)amine. The amount of adhesion promoter is that amount which enhances the adhesion of the curable composition to the substrate surface. The amount of adhesion promoter is preferably about 0.1 percent by weight or greater based on the weight of the adhesive and most preferably about 0.5 percent by weight or greater. The amount of adhesion promoter used is preferably about 10 percent by weight or less and most preferably about 2.0 percent by weight or less. The adhesion promoter can be located in either or both parts of a two part adhesive, in the one part adhesive and/or in the activator.

The composition may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. The polyester based isocyanate prepolymer can be prepared using one or more polyester polyols and preferably an aromatic polyisocyanate. In order to facilitate pumpability, it may be diluted with a plasticizer. The amount of polyester polyol in the prepolymer is a sufficient amount to support pumpability of the composition of the invention. Preferably, the polyester polyol based isocyanate prepolymer is present in the composition in sufficient amount to enhance green strength and the desired rheology of the composition. If the amount is too high, the composition is not hand gun applicable at ambient temperature. Preferably, the polyester polyol based isocyanate prepolymer is present in the composition in an amount of about 0 percent by weight or greater based on the weight of the composition, more preferably about 1 percent by weight or greater and most preferably about 2 percent by weight or greater. Preferably, the polyester polyol based isocyanate prepolymer is present in the composition in an amount of about 10 percent by weight or less, even more preferably about 5 percent by weight or less and most preferably about 3 percent by weight or less. Preferred polyester polyols are available from Creanova under the trade name DYNACOL and the designations 7381, 7360 and 7330, with 7381, most preferred. The one or more isocyanate functional prepolymers containing one or more polyester based polyols are preferably located in the resin or A side of a two part adhesive.

The curable compositions may further comprise one or more polyfunctional isocyanates for the purpose of improving the modulus of the composition in the cured form. "Polyfunctional" as used in the context of the isocyanates refers to isocyanates having a functionality of 2 or greater, more preferably a nominal functionality of about 3 or greater and most preferably a nominal functionality of about 3.2 or greater. Preferably, the polyfunctional isocyanates have a nominal functionality of about 5 or less, even more preferably about 4.5 or less and most preferably about 4.2 or less. The polyfunctional isocyanates can be any isocyanates which are reactive with the isocyanate polyisocyanate prepolymers and/or isocyanate reactive components used in the composition and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under the trademark of PAPI, including PAPI 20 or PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels may not be achieved. The polyfunctional isocyanate are preferably present in an amount of about 0.5 percent by weight or greater based on the weight of the composition, more preferably about 1.0 percent by weight or greater and most preferably about 1.4 percent by weight or greater. The polyfunctional isocyanates are preferably present in an amount of about 8 percent by weight or less, based on the weight of the composition, more preferably about 5 percent by weight or less and most preferably about 3 percent by weight or less. The one or more polyfunctional isocyanates are preferably located in the resin or A side of a two part composition.

The composition may further comprise stabilizers, which function to protect the adhesive composition from moisture, thereby inhibiting advancement and preventing premature crosslinking of the isocyanates in the curable composition. Stabilizers known to the skilled artisan for moisture curing adhesives may be used herein. Included among such stabilizers are diethylmalonate, alkylphenol alkylates, paratoluene sulfonic isocyanates, benzoyl chloride and orthoalkyl formates. Stabilizers are preferably used in an amount of about 0.1 percent by weight or greater based on the total weight of the curable composition, preferably about 0.5 percent by weight or greater and more preferably about 0.8 percent by weight or greater. Stabilizers are used in an amount of about 5.0 percent by weight or less based on the weight of the curable composition, more preferably about 2.0 percent by weight or less and most preferably about 1.4 percent by weight or less.

The composition may further comprise a hydrophilic material that functions to draw atmospheric moisture into the composition, which enhances the cure speed of the formulation. Preferably, the hydrophilic material is a liquid. Among preferred hydroscopic materials are pyrrolidones such as 1 methyl-2-pyrrolidone (or N-methyl pyrrolidone). The hydrophilic material is preferably present in an amount of about 0.1 percent by weight or greater based on the weight of the composition and more preferably about 0.3 percent by weight or greater. The hydrophilic material is preferably present in an amount of about 1.0 percent by weight or less and most preferably about 0.6 percent by weight or less.

The composition may further contain a catalyst other than a tertiary amine which catalyzes the reaction of isocyanate moieties with water or an active hydrogen containing compound. The catalyst can be any catalyst known to the skilled artisan for the reaction of isocyanate moieties with water or active hydrogen containing compounds. Among preferred catalysts are organotin compounds and metal alkanoates. Included in the useful organotin catalysts are compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. Organotin catalysts are preferably a dialkyltin dicarboxylate or a dialkyltin dimercaptide. Preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. Organotin or metal alkanoate catalysts are present in an amount of about 60 parts per million or greater based on the weight of the curable composition, more preferably 120 parts by million or greater. Organotin or metal alkanoate catalysts are present in an amount of about 1.0 part by weight or less based on the weight of the curable composition, more preferably about 0.5 parts by weight or less and most preferably about 0.1 parts by weight or less.

The two part compositions may comprise a curing agent located in the second part. Such curing agent comprises one of more compounds that contain greater than one active hydrogen containing functional group. The curing agents preferably contain hydroxyl groups. The curing agents can be one or more chain extenders, crosslinking agents, or polyols. Polyols as described hereinbefore can be utilized as curing agents. One class of polyols can be prepolymers as described hereinbefore prepared utilizing excess equivalents of active hydrogen functional groups such that the resulting prepolymers contain active hydrogen functional groups, preferably hydroxyl groups. The two parts are preferably combined such that the equivalents of isocyanate groups are greater than the equivalents of the isocyanate reactive groups. More preferably, the equivalents ratio of isocyanate groups to equivalents of isocyanate reactive groups is greater than about 1.0:1.0, even more preferably about 1.05:1.0 or greater and most preferably about 1.10:1.0 or greater. More preferably, the equivalents ratio of isocyanate groups to isocyanate reactive groups is about 2.0:1.0 or less, and most preferably about 1.40:1.0 or less. The one or more low molecular weight compounds have two or more isocyanate reactive groups and a hydrocarbon backbone wherein the backbone may further comprise one or more heteroatoms. Low molecular weight compounds may be chain extenders, difunctional, and/or crosslinkers, having on average, greater than two active hydrogen groups per compound. Preferably, the molecular weight of the low molecular weight compound is about 250 or less, more preferably 120 or less and most preferably about 100 or less. Preferably, the low molecular weight compound comprises one or more multifunctional alcohols, one or more adducts of multifunctional alcohol and an alkylene oxide or a mixture thereof. Among preferred multifunctional alcohols are ethane diol, propane diol, butane diol, hexane diol, heptane diol, octane diol, glycerine, trimethylol propane, pentaerythritol, neopentyl glycol, and the like. Blends of low molecular weight compounds may be used. The low molecular weight compounds are used in a sufficient amount to obtain the desired G-Modulus (E-Modulus). In two-part compositions, the low molecular compound may be located in the resin side, the curative side or both, preferably the curative side. Preferably, the low molecular weight compound is present in the composition in an amount of about 2 percent by weight or greater, more preferably about 2.5 percent by weight or greater and most preferably about 3.0 percent by weight or greater. Preferably, the low molecular weight compound is present in the composition in an amount of about 10 percent by weight or less, more preferably about 8 percent by weight or less and most preferably about 6 percent by weight or less.

In a two-part curable composition, the resin part (A) may further comprise polyoxyalkylene polyamine having 2 or greater amines per polyamine, preferably 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Preferred polyoxyalkylene polyamines include JEFFAMINE™ D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the curable composition in an amount of about 0.2 percent by weight or greater, more preferably about 0.3 percent by weight or greater and most preferably about 0.5 percent by weight or greater. Preferably, the polyoxyalkylene polyamine is present in the curable composition in an amount of about 6 percent by weight or less, more preferably about 4 percent by weight or less and most preferably about 2 percent by weight or less.

Other components commonly used in curable compositions may be used in the compositions. Such materials are well known to those skilled in the art and include heat stabilizers, ultraviolet stabilizers, durability stabilizers, antioxidants and the like. Among preferred durability stabilizers are alkyl substituted phenols, phosphites, sebacates and cinnamates. A preferred class of durability stabilizers includes organophosphites. The organophosphites are preferably present in a sufficient amount to enhance the durability of bond of the adhesive composition to the substrate surface. Such phosphites are disclosed in Hsieh et al. U.S. Pat. No. 7,416,599 column 10, line 47 to Column 11 line 25, incorporated herein by reference. Among preferred organophosphites are poly(dipropyleneglycol)phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably, the organophosphites are present in the composition in an amount of about 0.1 percent by weight or greater and more preferably about 0.2 percent by weight or greater based on the weight of the composition. Preferably the organophosphites are present in the composition in an amount of about 1.0 percent by weight or less and more preferably about 0.5 percent by weight or less based on the weight of the composition.

In some preferred embodiments, the composition may further include a light stabilizer. Any light stabilizer which facilitates the system maintaining durable bond to the substrate for a significant portion of the life of the structure to which it is bonded may be used. Preferred light stabilizers are hindered amine light stabilizers. Exempalary hindered amine light stabilizers are disclosed in Hsieh et al. U.S. Pat. No. 7,416,599 column 11, line 31 to line 63, incorporated herein by reference. More preferred light stabilizers include hindered light amine stabilizers such as Tinuvin 1,2,3 bis-(1-octyloxy-2,2, 6,6, tetramethyl-4-piperidinyl) sebacate and Tinuvin 765, bis (1,2,2,6,6,-pentamethyl-4-piperidinyl) sebacate. A sufficient amount of light stabilizer to enhance the durability of the curable composition, for example the bond durability to the substrate, may be used. Preferably, the light stabilizer is used in amount of about 0.1 percent by weight or greater based on the weight of the composition, more preferably 0.2 percent by weight or greater and most preferably about 0.3 percent by weight. Preferably, the amount of light stabilizer present is about 3 weight percent or less based on the weight of the composition, more preferably about 2 weight percent or less and most preferably about 1 weight percent or less.

In some preferred embodiments, the composition may further comprise an ultraviolet light absorber. Any ultraviolet absorber which enhances the durability of the curable composition, for example the bond durability to the substrate, may be used. Preferred UV light absorbers include benzophenones and benzotriazoles. Exemplary UV light absorbers include those disclosed in Hsieh et al. U.S. Pat. No. 7,416,599 column 11, line 64 to Column 12 line 29, incorporated herein by reference. More preferred UV light absorbers include Cyasorb UV-531 2-hydroxy-4-n-octoxybenzophenone and Tinuvin 571 2-(2H-benzotriazol-2-yl)-6-dodecyl-4-methylphenol, branched and linear. Preferably, the UV light absorber is used in sufficient amount to enhance the durability of the bond of the adhesive to the substrate. Preferably, the UV absorber is used in an amount of about 0.1 percent by weight or greater based on the weight of the composition, more preferably about 0.2 weight percent or greater and most preferably about 0.3 weight percent or greater. Preferably, the UV light inhibitor is used in amount of about 3 percent by weight or less based on the weight of the composition, more preferably about 2 percent by weight or less and most preferably about 1 percent by weight or less.

The one part composition or each component for each part of a two part composition may be formulated by blending the components together using means well known in the art. The components are blended in a suitable mixer, preferably conducted under a vacuum or in an inert atmosphere, such as nitrogen or argon, in the absence of oxygen and atmospheric moisture to prevent premature reaction. It may be advantageous to add plasticizers to the reaction mixture for preparing the isocyanate functional prepolymers so that such mixtures may be easily mixed and handled. Alternatively, the plasticizers can be added during blending of all the components. The ingredients are blended for a sufficient time to prepare a well blended mixture, preferably from about 10 to about 60 minutes. Once the composition is formulated, it is packaged in a suitable container such that it is protected from atmospheric moisture and oxygen. Contact with atmospheric moisture and oxygen could result in premature crosslinking of the prepolymers containing isocyanate groups.

The compositions may be used to bond a variety, of substrates together, such as porous and nonporous substrates. The composition is applied to a substrate and the composition on the first substrate is thereafter contacted with a second substrate. In some preferred embodiments, the surfaces to which the composition is applied are cleaned, activated and/or primed prior to application, see for example, U.S. Pat. Nos. 4,525,511; 3,707,521 and 3,779,794, relevant parts of all are incorporated herein by reference. The one part compositions of the invention are applied at temperatures at which the compositions can be pumped.

The compositions may be used to bond glass or scratch resistant plastic to other substrates such as metal or plastics. The first substrate may be a window and the second substrate a window frame. The window may comprise glass or a transparent plastic with an abrasion resistant coating deposited on the plastic surface. In another preferred embodiment the first substrate is a window and the second substrate is a window frame of an automobile. Preferably, the window is cleaned and may have a glass wipe or primer applied to the area to which the composition is to be bonded. The window flange may be primed with a paint primer. The composition is applied in a bead to the periphery of the window located such that it will contact the window flange when placed in the vehicle. The window with the composition located thereon is then placed into the flange with the composition located between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter, the composition is allowed to cure. The compositions of the invention can be used to bond replacement glass into a structure. In this embodiment, the old window or a portion thereof is removed from the window flange or frame. This is achieved by cutting the old adhesive between the glass and the flange or frame. A portion of the old adhesive may remain on the flange or window frame. The portion of the flange or frame that does not have old adhesive deposited thereon can be primed. The composition can be applied to the frame or flange over the old adhesive and will bond to the old adhesive. The old adhesive may be a polyurethane, siloxane, siloxy functional polyether or siloxy functional polyolefin In use, the components of two-part compositions are blended as would normally be done when working with such materials. For a two-part compositions to be most easily used in commercial and industrial environments, the volume ratio at which the two pans are combined should be a convenient whole number. This facilitates application of the curable composition with conventional, commercially available dispensers. Preferably the two parts are mixed after contacting or are contacted with mixing. Any known means of mixing curable components may be utilized including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. These dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended composition is extruded from the mixing chamber onto one or more substrates. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. Each plunger is sized to be received within a tube of fixed diameter, and the plungers are advanced into the tubes at the same speed. A single dispenser is often intended for use with a variety of different two-part polymerizable compositions and the plungers are sized to deliver the two parts of the polymerizable composition at a convenient mix ratio, for example from 1:1 to 1:100. Some common mix ratios are 1:1, 2:1, 4:1, 10:1 and 76:1. Preferably, the two parts are blended at a mix ratio of about 10:1.

Preferably, the mixed two-part compositions of the invention have a suitable viscosity to allow application without dripping. Preferably, the viscosities of the two individual components are of the same order of magnitude. For lower viscosities, the components may require gelling agent known in the art to prevent sag of the uncured adhesive system. Curing can be accelerated by applying heat to the composition by means of infrared heat, induction heat, convection heat, microwave heating, application of ultrasonic vibration and the like. Preferably, the compositions are formulated to provide an open time of at least about 6 minutes or greater and preferably about 14 minutes or less. Preferably the cure rate is determined by determining, the dynamic yield stress, measured by G' on a rheometer. Preferably the G' is 0.5 MPa the strength of the curing adhesive at a designated time. In another embodiment the compositions of the invention can be used to bond modular components to a car body or to each other. Examples of modular components include vehicle modules, such as doors, windows or bodies.

Illustrative Embodiments of the Invention

The following examples are provided to illustrate the invention, but are not intended to limit the scope thereof. All parts and percentages are by weight unless otherwise indicated.

Preparation of Polyether Prepolymer 1

A polyether polyurethane prepolymer is prepared by mixing 270 g of a polyoxypropylene having an ethylene oxide end cap and a weight average molecular weight of 2000 with 164 g of a polyoxypropylene triol having a weight average molecular weight of 4500 and 125 g of a styrene acrylonitrile dispersed polyoxypropylene triol with a weight average molecular weight of 3500. Mixing is carried out in a reactor by heating the mixture to 48° C. 87 g of dipheylmethane-4,4'-diisocyanate and 0.5 g stannous octoate are added to the mixture. The whole mixture is then reacted for 1 hour at about 65° C. 323 g of a diisononyl phthalate plasticizer is added to the mixture and the mixing is continued for about 0.5 hour. Thereafter, 6 g of gamma-glycidylpropyl trimethoxysilane and 14 g of a blend of a trisnonylphenyphosphite, 2-(2H-benzotriazole-2-yl)-6-dodecyl-4-methylphenol and bis(2,2,6,6,-pentamethyl-4-piperdinyl) sebacate in equal amounts, about 14 g are added to the mixture. The resulting prepolymer has an isocyante content of about 1 percent by weight, contains 32 percent of phthalate plasticizer and exhibits a viscosity of about 25,000 to 45,000 centipoise.

Preparation of Polyether Prepolymer 2

A polyether polyurethane prepolymer is prepared by mixing 203 g of a polyoxypropylene diol having a weight average molecular weight of 2,000 with 294 g of a polyoxypropylene triol having an ethylene oxide cap and weight average molecular weight of 4,500. Mixing is carried out in a reactor by heating the mixture to 48° C. 90 g of dipheylmethane-4,4'-diisocyanate and 0.5 g of stannous octoate are added to the mixture. The whole mixture is then reacted for 1 hour at 65° C. Finally, a sufficient amount of diisononyl phthalate plasticizer is added to the mixture such that the concentration of plasticizer is 33 percent (about 295 g) and the mixing is continued for 1 hour. The resulting prepolymer has an isocyanate content of about 1.5 percent by weight, contains 33 percent of phthalate plasticizer and exhibits a viscosity of about 4,000 to about 9,000 centipoise. The prepolymer exhibits an ethylene oxide content of 0.9 and a urea and urethane density of 4.

A Side Preparation Process

The following ingredients are combined as described hereinafter.

TABLE 1

| Component | Weight Percent |
|---|---|
| Prepolymer 1 | 39.74 |
| Prepolymer 2 | 18.29 |
| Diisononyl phthalate Part 1 | 5.3 |
| alkylsulphonic acid ester with phenol | 2.79 |
| Calcium carbonate | 9 |
| Carbon Black | 24 |
| Dimorpholino diethyl ether | 0.4 |
| Bismuth Octoate | 0.25 |
| Gamma-glycidoxypropyltrimethoxysilane | 0.23 |
| Total | 100 |

Prepolymer 1, Prepolymer 2, Diisononyl phthalate and alkylsulphonic acid ester with phenol are charged to a mixer and degassed for 15 minutes. The inorganic filler and carbon black are pre-dried and charged to the mixer and mixed for 5 minutes at slow speed under vacuum until it is sufficiently wetted by the prepolymers. The mixing speed is increased and mixed for 20 minutes under vacuum. The dimorpholino diethyl ether, bismuth octoate and silane additive are added and the mixture is mixed for 30 minutes and packaged in a moisture proof container.

B Side Preparation Process

The ingredients listed in Table 2 are weighed and blended in a hood.

TABLE 2

| Ingredient | B-1 | B-2 | B-3 | B-4 |
|---|---|---|---|---|
| Diisononyl phthalate (g) | 10 | 9 | | 9 |
| Methyl methacrylate (g) | | | 9.5 | |
| Cumene peroxide (g) | | 1 | 0.5 | |
| Tert-butyl peroxybenzoate (g) | | | | 1 |

Adhesive Cure Testing

The A side and the B side are utilized in a 10 to 1 ratio. 10 parts of Side A are weighed and added to a plastic zippered bag. 1 part of the B side is weighed out and added to the zippered bag. The bag is quickly closed and hand mixed for about 45 seconds. The mixture is compressed into a corner of the bag with no air. A small hole is snipped in the corner of the bag with the material. A small amount of the material is squeezed on a 25 mm lower disposable plate for a Texas instruments A-2000 rheometer. The plate gap is set at 1014 microns. Any excess material is removed from around the disposable plate. The air bearings on the rheometer are locked. The plate gap is then lowered to 914 microns. A dynamic time sweep test is run for 30 minutes with a controlled strain at 0.75 percent, at 25° C. and a frequency of 1.0 hertz. The storage modulus G' value is a measure of the deformation energy stored in the sample during the shear process it represents the rigidity of the sample, i.e. the resistance to deformation. The results for a curable composition with each B Side of the G' modulus versus time are illustrated in FIG. 1.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient; component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. A composition comprising two parts A and B:
wherein part A includes,
  a) from 10 to 70 percent by weight of one or more isocyanate functional prepolymers which are the reaction product of an excess on an equivalents basis of one or more polyisocyanates with one or more compounds having two or more active hydrogen containing groups;
  b) from 0.05 to 5.0 percent by weight of one or more compounds containing one or more cycloaliphatic tertiary amino groups;
  c) from 5 to 35 percent by weight of one or more plasticizers; and,
  d) from 1 to 40 percent by weight of one or more fillers;
wherein Part B comprises,
  e) from 0.05 to 5 percent by weight of one or more compounds containing one or more hydroperoxide groups;
wherein the composition may include
  f) from 0 to 70 percent by weight of one or more compounds containing acrylate groups located in part A, part B or a combination thereof; the equivalents ratio of one or more compounds containing one or more hydroperoxide groups to one or more compounds containing one or more cycloaliphatic tertiary amino groups is about 50:1 to about 100:1 and the amounts are based on the weight of the composition.

2. A composition according to claim 1 wherein the composition comprises:
  a) from 30 to 50 percent by weight of one or more isocyanate functional prepolymers;
  b) from 0.1 to 1.0 percent by weight of one or more compounds containing cycloaliphatic tertiary amino groups;
  c) from 0.1 to 2.0 percent by weight of one or more compounds containing hydroperoxide groups; and
  d) from 5 to 40 percent by weight of one or more compounds containing acrylate groups;
wherein the equivalents ratio of one or more compounds containing one or more hydroperoxide groups to one or more compounds containing one or more cycloaliphatic tertiary amino groups is about: 50:1 to about 100:1 and the amounts are based on the weight of the composition.

3. A composition according to claim 1 wherein the composition exhibits a G' modulus of 0.5 MPa or greater fifteen minutes after contacting the separated parts of the composition.

4. A method comprising:
  i) contacting the separated parts of the composition according to claim 1;
  ii) contacting the contacted composition of i) with a first substrate;
  iii) contacting the first substrate with a second substrate with the composition of i) disposed between the two substrates;
  iv) allowing the composition of i) to cure and bond the two substrates together.

5. A method according to claim 4 wherein the two parts are mixed before contacting with the first substrate.

6. A method according to claim 4 wherein after step iii) the contacted substrates are exposed to elevated temperatures to accelerate the cure of the composition of i).

7. A method according to claim 4 wherein the first substrate is glass or transparent plastic, wherein the glass or transparent plastic may have an organic or ceramic enamel frit located about the periphery of the glass or transparent plastic and the second substrate is plastic or metal which may be coated.

8. A method according to claim 4 wherein the composition of i) exhibits a G' modulus of 0.5 MPa or greater fifteen minutes after contacting the separated parts of the composition.

9. A composition according to claim 1 which includes one or more polyfunctional isocyanates in part A.

10. A composition according to claim 9 wherein the composition includes one or more polyfunctional isocyanates are present in an amount of about 0.5 to about 8 percent by weight.

11. A composition according to claim 1 which includes one or more adhesion promoters in part A, part B or both.

12. A composition according to claim 11 wherein the one or more adhesion promoters are present in an amount of about 0.1 to about 10 percent by weight.

13. A composition according to claim 1 which further comprises one or more compounds, oligomers or polymers containing one or more acrylate groups.

14. A composition according to claim 1 wherein the one or more isocyanate containing prepolymers contain from about 0.1 to about 35 percent by weight of free isocyanate groups.

15. A composition according claim 1 wherein the composition is a two part adhesive.

16. A composition according claim 2 wherein the composition a) from 30 to 60 percent by weight of one or more isocyanate functional prepolymers.

* * * * *